(12) United States Patent
Figenschou et al.

(10) Patent No.: US 11,978,575 B2
(45) Date of Patent: May 7, 2024

(54) POWER UMBILICAL AND METHOD

(71) Applicant: Aker Solutions AS, Lysaker (NO)

(72) Inventors: Arild Figenschou, Billingstad (NO); Mehrdad Karimpour, Oslo (NO); David Hickman, Mobile, AL (US); Kevin Lerch, Mobile, AL (US)

(73) Assignee: Aker Solutions AS, Lysaker (NO)

( * ) Notice: Subject to any disclaimer, the term of this patent is extended or adjusted under 35 U.S.C. 154(b) by 0 days.

(21) Appl. No.: 17/740,906

(22) Filed: May 10, 2022

(65) Prior Publication Data

US 2022/0375650 A1 Nov. 24, 2022

(30) Foreign Application Priority Data

May 18, 2021 (NO) .................................. 20210612
Oct. 26, 2021 (NO) .................................. 20211281

(51) Int. Cl.
| | | |
|---|---|---|
| *H01B 7/14* | (2006.01) | |
| *H01B 7/04* | (2006.01) | |
| *H01B 7/285* | (2006.01) | |
| *H02G 9/02* | (2006.01) | |

(52) U.S. Cl.
CPC ............ *H01B 7/285* (2013.01); *H01B 7/045* (2013.01); *H01B 7/14* (2013.01); *H02G 9/02* (2013.01)

(58) Field of Classification Search
CPC ........... H01B 7/045; H01B 7/14; H01B 7/285
See application file for complete search history.

(56) References Cited

U.S. PATENT DOCUMENTS

| | | | | |
|---|---|---|---|---|
| 6,417,457 | B1* | 7/2002 | Aasbo | H01B 7/187 174/120 R |
| 6,443,383 | B1* | 9/2002 | Stasny | B65H 75/265 242/388 |
| 2010/0012342 | A1* | 1/2010 | Figenschou | H01B 13/0271 174/47 |
| 2020/0176149 | A1 | 6/2020 | Karimpour | |

FOREIGN PATENT DOCUMENTS

| | | |
|---|---|---|
| EP | 2504846 A1 | 10/2012 |
| EP | 2521139 A1 | 11/2012 |
| EP | 3244422 A1 | 11/2017 |
| EP | 3281209 A1 | 2/2018 |
| NO | 20101584 A1 | 11/2010 |
| NO | 345360 B1 | 12/2020 |
| SE | 504275 C2 | 12/1996 |
| WO | WO-2008075964 A1 | 6/2008 |
| WO | WO-2011065842 A1 | 6/2011 |
| WO | WO-2016162076 A1 | 10/2016 |

\* cited by examiner

*Primary Examiner* — Chau N Nguyen
(74) *Attorney, Agent, or Firm* — Bradley Arant Boult Cummings LLP (57) ABSTRACT

Power umbilical (1) comprising a plurality of power cables (7) for electric power transmission, elongated filler elements (5), and an outer sheath (3). The elongated filler elements (5) abut against each other at abutment faces (5a), thereby forming a complete ring enclosing the power cables (7). The elongated filler elements (5) comprise cable recesses (5b) within which the power cables (7) are embedded. The power umbilical (1) further comprises one or more friction control profiles (13, 15, 116), wherein the material of the friction control profile (13, 15, 116) is softer than the material of the elongated filler elements (5). The one or more friction control profiles (13, 15) are arranged in a deformed state.

19 Claims, 8 Drawing Sheets

POWER UMBILICAL AND METHOD

TECHNICAL FIELD

The present invention relates to power umbilicals, typically used offshore to electrically connect various power providers and power consumers. A typical use could be within the field of offshore power generation, such as with floating wind turbines or floating PV plants (solar power plants). Another typical use could be powering of large electric loads, such as subsea pumps.

BACKGROUND ART

In general, when cables are bundled together, they are arranged into shapes closely resembling a helix. Since helices have a continuous curvature, any axial force applied to the cables through bending, gravity, tension, thermal expansion, or other sources, will result in a radial force component aligned with the center of the curvature of the helix. This effect will be present for any portion of the cable when the geometry approximates a helix, meaning that it is also applicable for S-Z stranded bundles or bundles with an alternating helical shape. These forces will result in internal friction, whose magnitude is dependent several factors including, but not limited to, distance from the neutral axis of the cable, the stiffness of the singular elements, the overall tension applied to the system and the curvature it is bent to. The cabling industry normally defines two stages of internal force generation. These stages are the stick mode and the slip mode. The stick mode is when the internal elements do not slide relatively to its neighboring elements during a change in curvature because the generated axial forces from bending do not exceed the holding force of friction. The generated force is then relatively high and is dependent on the element's distance from the neutral axis of the system. When the generated force gets to a level where it overcomes the frictional effect, adjacent elements start to slide against each other. The elements are then in the slip mode. An accurate quantification of this effect is difficult to predict. However, it has a significant impact on the fatigue life of an umbilical.

Moreover, umbilicals extending with a vertical component are exposed to gravity forces that pull on the various elements of the umbilical. In a vertical section of a power umbilical, the one or more power cables inside the umbilical must be maintained in their axial position to prevent the heavy power cables from being displaced with respect to the rest of the umbilical. To prevent such displacement, i.e. to retain the power cables in place, it is known the fixate the power cables and the rest of the umbilicals at termination points. In this manner, the heavy power cables are suspended together with the rest of the umbilical at one suspension point.

Publication NO345360 describes an umbilical with an inner core, such as an electric conductor, an outer jacket, and a plurality of deformable rods between the core and the sheath. The deformable rods are configured to be deformed, i.e. to be compressed, when the umbilical is impacted in a radial direction. Furthermore, the deformable rods are configured to retain their previous shape once the impact load is removed. Typical materials of the deformable rods can be rubber or a rubber-like soft thermoplastic polyurethane elastomer.

The technical challenges with the stick mode and the slip mode discussed above are however not so relevant for umbilicals having only one electric cable, such as the umbilical disclosed in NO345360. The center axis of this umbilical will always extend through this one electric cable, resulting in less tension and compression.

Publication EP2504846 discloses an umbilical where frictional means are provided at intervals along the extension of the umbilical. The frictional means cooperate with the filler material of the umbilical, for frictional engagement for load end weight transfer.

When installing umbilicals according to the prior art, they must in some applications be pre-fabricated with pre-defined lengths and pre-manufactured suspension points. An object of the present invention may be to provide an umbilical that can be installed without the need of such suspension points.

An object of the present invention may also be to provide a solution where the discussed stick and slip modes are controlled to an acceptable range. That could prevent excessive slip of the topside cable pigtails from receding into the umbilical. It may also allow for relative motion between elements during reeling, handling, and operation since pure stick may cause damage to the cable due to failure modes such as tensile rupture, buckling, fatigue, or insulation delamination.

A further object may be to provide a solution wherein the frictional effect between the elements can be better predicted.

SUMMARY OF INVENTION

According to a first aspect of the present invention, there is provided a power umbilical comprising a plurality, for instance three, power cables for electric power transmission, elongated filler elements, and an outer sheath. The elongated filler elements abut against each other at abutment faces, thereby forming a complete ring enclosing the power cables. The elongated filler elements comprise cable recesses within which the power cables are embedded. The power umbilical further comprises one or more friction control profiles. The material of the friction control profile is softer than the material of the elongated filler elements. Moreover, the one or more friction control profiles are arranged in a compressed state.

With the term power umbilical is herein meant a power umbilical rated for electric power transmission of at least 1 MW and/or a power umbilical having a conductor cross-section area of at least 300 mm$^2$.

The power umbilical according to the invention can typically have an axial extension of more than 100 meters, more than 1000 meters, or even more than 10 km.

With the term friction control profile is meant an elongated element that is interposed between other elongated elements—including one or more power cables—of the power umbilical, and which is compressed into a deformed state when the power umbilical is manufactured. As laid out further below, controlled compression of the friction control profiles is used to govern the internal friction inside the power umbilical in a predictable manner. By stating that the friction control profile is deformed, it is meant that its shape has been changed by compressive forces.

According to an embodiment of the present invention, the power cables are embedded within the cable recesses with a distance from the cable recesses. Moreover, the friction control profiles extend along the elongated filler elements, and the friction control profiles are arranged in a deformed state between the elongated filler elements and the power cables.

It shall be appreciated that the said distance extends across a space that is empty, except for the presence of the friction control profiles. That is, the curvature of the cable recesses has a larger radius than the curvature of the power cables. When a power cable is arranged coaxially with the curvature of the cable recess, the said distance will then be present between the cable recess and the power cable. Moreover, in some embodiments, one or more friction control profiles will bridge the distance.

In some embodiments, the power umbilical can comprise a friction control profile arranged in a compressed state between three or more power cables.

By stating that the friction control profile is in a compressed state between the three or more power cables, it is meant that the friction control profile has been compressed with forces from the respective three or more power cables.

In some embodiments, there may also be present the auxiliary friction control profiles, which each abut against two power cables and against one or more filler elements.

In some embodiments, the friction control profile can be a compressed, hollow tube. Typically, it can comprise rubber.

The wall thickness of the hollow tube can in some embodiments be at least 50% of the inner diameter of the hollow tube. As the skilled person will appreciate, the inner bore of such a hollow tube is not present for communicating a fluid or similar, but rather for providing a compressible friction control profile that is suitable for friction control.

In some embodiments, a mutual power cable distance can be present between the power cables. The mutual power cable distance can typically be provided by the compressed friction control profiles maintaining the power cables somewhat apart.

It will be understood that this relates to a non-bent power umbilical, since excessive bending of the umbilical may result in that the power cables may abut against each other.

In some embodiments, the elongated filler elements can comprise profile retainers. The profile retainers are configured to maintain the friction control profiles in their correct location within the power umbilical.

In such embodiments, the profile retainers can be in the form of profile recesses that are recessed in the cable recesses.

Alternatively, in such embodiments the profile retainers can be in the form of element protrusions that protrude into retainment faces of the friction control profiles.

In some embodiments of the first aspect of the invention, when the power umbilical is in a non-bent and straight state, the power cables only abut against friction control profiles, or only abut against friction control profiles and adjacent power cables.

The power umbilical may further comprise an intermediate friction control profile that is abutting against the power cables.

The respective power cables can in some embodiments abut against two friction control profiles, or the respective power cables can abut against two friction control profiles and an intermediate friction control profile. Furthermore, the two friction control profiles can be angularly displaced away from a radially extending line extending from the power umbilical center axis and through a center axis of the respective power cable.

In other words, these imaginary lines will in such embodiments not extend through the friction control profiles. With such embodiments, the provision of friction control profiles can be accomplished without additional overall diameter of the power umbilical.

In some embodiments, the friction control profiles can have one, two or more deformable ridges.

Advantageously, in such embodiments, the friction control profiles may also comprise one or more auxiliary ridges that protrude a smaller distance than the deformable ridges. The auxiliary ridges are also deformable.

In some embodiments, the deformable ridges protrude towards and against the power cable. In other embodiments, however, the friction control profile may comprise outward ridges that protrudes away from the power cable.

Providing the friction control profiles with such ridges is advantageous for designing friction control profiles that shall be adjusted to a desired range of friction.

The power umbilical can in some embodiments further comprise a shim between the profile retainer and the friction control profile. The shim has a smaller axial extension than the power umbilical.

In embodiments comprising the said shim, the axial extension of the shim can be less than $1/10$, $1/100$, or less than $1/1000$ of the axial extension of the power umbilical.

When installing such power umbilicals comprising such one or more shims, one can for instance locate the part of the umbilical that is provided with the one or more shims at a hang-off location, such as on a floating structure offshore. A portion of the umbilical that is exposed to movement, such as due to waves or water currents, can advantageously be without the shims. The shims then contribute in arresting the power cables, while the dynamic portion of the umbilical will tolerate significant movements without excessive wear.

The material of the friction control profiles can advantageously comprise rubber.

In some embodiments, the friction control profiles can be semiconductive.

Moreover, in some embodiments the material of the friction control profiles can comprise other elastomers, such as polychloroprene (commonly referred to as neoprene).

In some embodiments, each power cable set can comprise a plurality of power cables and each power cable set can be configured as one separate cable.

According to a second aspect of the present invention, there is provided a method of manufacturing a power umbilical comprising a plurality of power cables, elongate filler elements, deformable friction control profiles, and an outer jacket. The method comprises the following steps:

a) providing a disrupted circle of the elongate filler elements that encircles the power cables;

b) interposing friction control profiles between the elongated filler elements and the power cables and/or interposing an intermediate friction control profile between three or more power cables;

c) providing the outer jacket radially outside the elongate filler elements;

wherein the method further comprises, during step c), compressing the friction control profiles as the outer jacket shrinks and thereby forces the elongated filler elements into a continuous circle.

With the term deformable friction control profiles is meant that the friction control profiles have a shape that becomes compressed when the filler elements are moved, during production, from their position forming a disrupted circle around the power cables, to their position forming a continuous circle around the power cables. While the elongated filler elements are made of a material that will withstand the compressive force form the shrinking outer jacket, the friction control profile are made of a material that will not withstand the compressive force. The material of the friction control profiles is softer than the material of the elongated filler elements.

The Young's modulus of the friction control profiles can for instance be in the range of range of 5 to 200 MPa, or the range of 10-100 MPa.

The Young's modulus of the elongated filler elements can be in the range of 3 to 5 GPa or in the range of 1-10 GPa.

In some embodiments of the method according to the second aspect of the invention, the elongated filler elements can comprise cable recesses and step a) can comprise arranging the power cables in said cable recesses.

The method can further include interposing a shim between one or more elongated filler elements and the friction control profiles. The shim will have an axial extension that is less than the axial extension of the power umbilical.

Moreover, the method can further comprise coextruding friction control profiles and elongated filler elements.

The method can also comprise arranging the friction control profiles in profile recesses of the elongated filler elements.

As the skilled person will appreciate, the method according to the second aspect of the invention can be used for manufacturing a power umbilical according to the first aspect of the invention.

While the term power umbilical is used herein, another reasonable term could be power transmission cable. That is, the use of the term umbilical is not intended to mean that the umbilical must comprise for instance fluid lines, as many umbilicals do. The power umbilical according to the invention may, however, comprise one or more fluid lines.

DETAILED DESCRIPTION OF THE INVENTION

While various features and embodiments of the invention have been discussed in general terms above, some detailed and non-limiting examples of embodiment will be presented in the following with reference to the drawings, in which.

Figure 1:
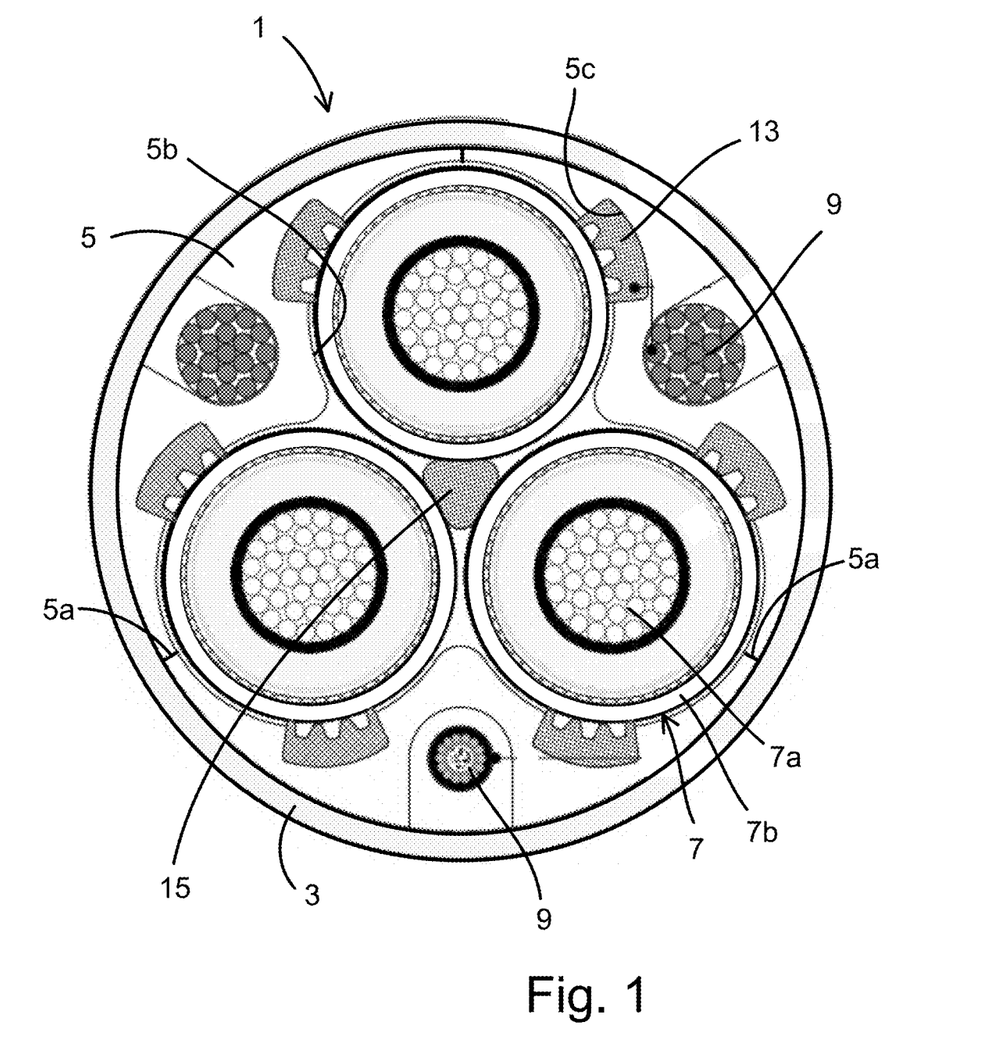
FIG. 1 depicts a cross section through a power umbilical according to the present invention.

FIG. 1 shows a cross section through an umbilical 1 according to the present invention. As is common in the art, it comprises an outer jacket 3, elongated filler elements 5, and power cables 7. In this embodiment, the umbilical 1 comprises three power cables 7, thus enabling it to transport electric power in a three-phase system. The power cables 7 have a conducting core 7a, typically made of copper, and a cable sheath 7b.

In the shown embodiment, the umbilical 1 comprises three elongated filler elements 5. They abut against each other at their lateral abutment faces 5a such that they together form a complete ring in the cross-sectional view.

In the present embodiment, the abutment faces 5a are substantially coinciding with three imaginary lines that extends from the center axis of the umbilical 1 and through the respective center axes of the respective power cables 7.

In the shown embodiment, the elongated filler elements 5 are arranged radially immediately within the outer jacket 3.

With umbilicals such as the umbilical 1 shown in FIG. 1, it is common to extrude the outer jacket 3 onto the elongated filler elements 5 during production. The outer jacket 3, which typically is made of a plastic material, such as polyethylene, will shrink during settling. This results in a tight fit between the outer jacket 3 and the elongated filler elements 5. Moreover, this ensures a tight contact between the respective elongated filler elements 5 at their abutment faces 5a.

While the polyethylene of the outer jacket 3 typically can have a Young's modulus of about 300 MPa, the elongated filler elements 5 can be significantly harder. In some embodiments where the elongated filler elements 5 are made of polyvinyl chloride (PVC), the Young's modulus can typically be about 3-4 GPa.

The umbilical 1 according to the invention can be produced with a helical twist, which is common in the art. Alternatively, the umbilical 1 can be produced with alternating helical directions, known in the art as the Oscilay method.

Still referring to FIG. 1, the elongated filler elements 5 comprise cable recesses 5b configured to receive the outer face of the power cables 7. In the shown embodiment, each of the three elongated filler elements 5 comprises two cable recesses 5b. Of the two cable recesses 5b, one respective cable recess 5b receives one of two neighboring power cables 7.

It will be understood that other embodiments may have more than three elongated filler elements 5, for instance four, five or even more. Some embodiments may include only two elongated filler elements 5. This will typically depend on the type of umbilical produced.

The umbilical 1 may further comprise auxiliary elements 9, such as optical cables, electric control cables, fluid pipes, steel wires, and more. Such components of an umbilical are well known in the art.

Figure 2:
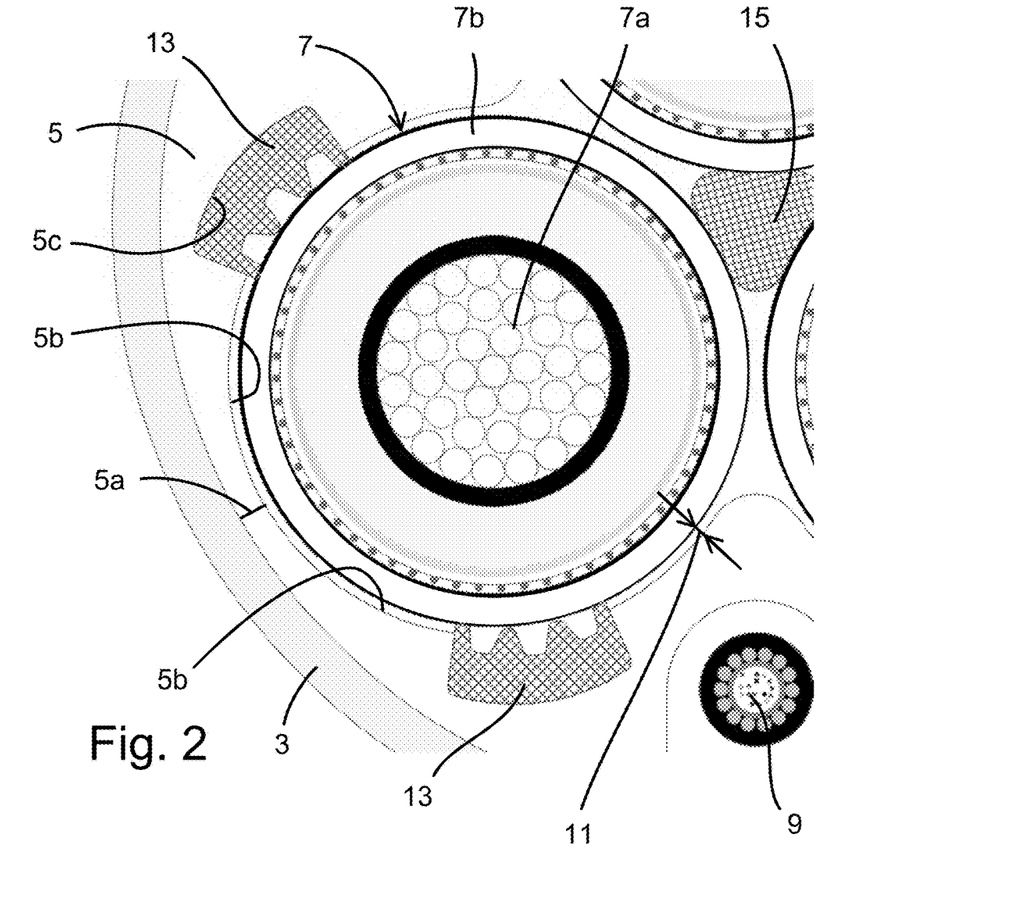
FIG. 2 shows an enlarged section of the umbilical in FIG. 1.

Reference is made to FIG. 2, which is an enlarged portion of the umbilical shown in FIG. 1. The curvature of the cable recess 5b is fitted to the curvature of the outer face of the cable sheath 7b. The face of the cable recess 5b curves in a parallel fashion along the curvature of the cable sheath 7b, however with radial distance. In FIG. 2, this radial distance is indicated as distance 11.

Still referring to FIG. 2, the umbilical 1 further comprises a plurality of friction control profiles 13. The friction control profiles 13 are elongated profiles that extend in parallel with the elongated filler elements 5.

In the embodiment discussed with reference to FIG. 1 and FIG. 2, the friction control profiles 13 are kept in place by means of profile retainers. In the shown embodiment, the profile retainers are in form of profile recesses 5c. The profile recesses 5c are provided in the elongated filler elements 5. Furthermore, in the embodiment shown in FIG. 1 and FIG. 2, the profile recesses 5c are provided in the cable recesses 5b, such that they face the power cables 7.

The friction control profiles 13 extend from the profile recesses 5c and beyond the face of the cable recesses 5b. Hence, because of the distance 11 between the face of the cable recess 5b and the outer face of the cable sheath 7b, the power cables 7 will contact the friction control profiles 13 and not the elongated filler elements 5. As the skilled person will appreciate, upon excessive bending of the power umbilical 1, the forces inside it may overcome the forces from the friction control profiles 13, and then contact between the power cables 7 and the elongated filler elements 5 may occur. The operator should thus ensure that the bending of the power umbilical 1 remains within an acceptable range.

Figure 3:
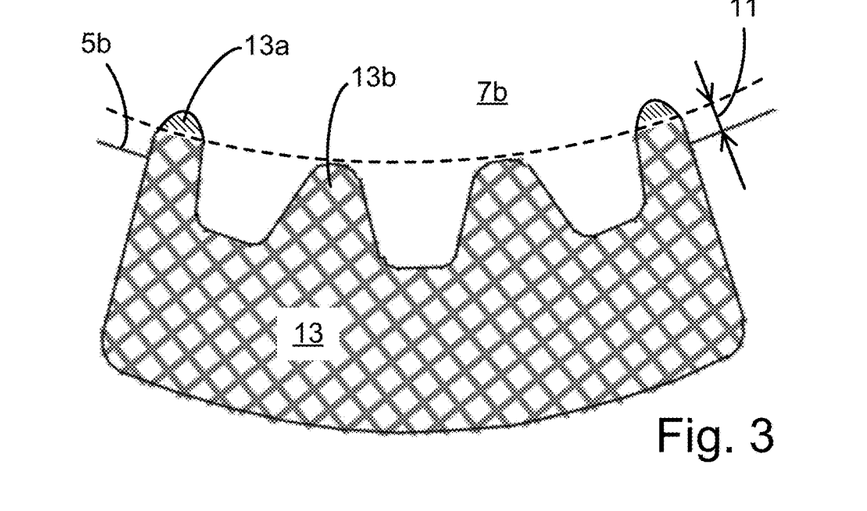
FIG. 3 is an enlarged view of a friction control profile of the umbilical in FIG. 1.

FIG. 3 depicts an enlarged cross section through one friction control profile 13, together with the face of the cable recess 5b and with the outer face of the cable sheath 7b indicated with a dashed line. In this image, the friction control profile 13 is shown in its original state, i.e. a non-compressed state. When assembling the umbilical 1, the friction control profile 13 will have this shape before the assembly.

As briefly discussed above, the elongated filler elements 5 will together form a complete ring when they are compressed by the outer jacket 3. Before this compression, the friction control profiles 13 will abut the power cables 7. Hence, during compression of the elongated filler elements 5 to form the complete ring, the friction control profiles 13 will be compressed between the outer face of the power cables 7 and the profile retainers (which in the shown embodiment are in form of profile recesses 5c).

The original, non-compressed dimensions of the friction control profiles 13 are known.

Moreover, the degree of compression of the friction control profiles 13 is known, because the outer jacket 3 of the umbilical 1 will compress the elongated filler elements 5 into the complete ring, but not further. This is because the material of the elongated filler elements 5 is sufficiently hard to withstand the compression forces from the outer jacket 3.

In this manner, one is able to design an umbilical 1 wherein the friction between the power cables 7 and the other elements of the umbilical 1 is known and predictable, at least within certain ranges.

In typical embodiments of the present invention, during production of the umbilical 1, the friction control profile 13 can be compressed for instance between 1 and 4 mm, or between 1 and 3 mm, such as 2 mm. Depending on the embodiment, the compression distance can also be smaller or larger than these examples.

In addition to choosing the degree of compression of the friction control profiles 13, a further parameter that will govern the friction is the choice of material in the friction control profiles 13. For instance, making the friction control profiles 13 of rubber will provide friction control profiles 13 that are fairly soft. A typical Young's modulus of the material in the friction control profiles 13, for instance rubber, can be in the range 10-100 MPa.

Furthermore, the material of the friction control profiles 13 is advantageously of a type that displays deformability and shape memory. Again, rubber is an example of a suitable material for fulfilling such requirements.

As the skilled person will appreciate, when the umbilical 1 according to the present invention is bent, one part of the umbilical will be compressed in the axial direction, while another part will experience tension. Furthermore, the umbilical will experience radial compression. With the design according to the invention, the friction control profiles 13 will absorb such compression. Moreover, due to the shape memory characteristic, when the umbilical becomes straightened, the friction control profiles 13 will "follow", i.e. they will continue to exert a force against the power cables 7 within a predictable range.

Consequently, the present design is suited for dynamic umbilicals.

Still referring to FIG. 3, the friction control profile 13 comprises a deformable ridge 13a. The outer face of the power cable 7 is shown with the dashed line that extends through a portion of the deformable ridge 13a. Hence, when the umbilical 1 is assembled, this portion of the deformable ridge 13a is compressed when abutting the power cable 7.

In the embodiment shown in FIG. 3, the friction control profile 13 further comprises auxiliary ridges 13b. When the umbilical 1 is in the assembled and straight state, the auxiliary ridges 13b will not abut against the power cable 7.

In the embodiment shown in FIG. 1, six friction control profiles 13 are shown in a position where they abut the three power cables 7 on their radially outer half (i.e. radially with respect to the umbilical 1). In addition, there is arranged an intermediate friction control profile 15 in the position between the three power cables 7. When the outer six friction control profiles 13 are compressed against the three power cables 7, the power cables 7 will transmit compression forces against the intermediate friction control profile 15.

The intermediate friction control profile 15 can advantageously have the same Young's modulus as the friction control profiles 13. It may, however, also be harder or softer.

In the umbilical 1 shown in FIG. 1, an umbilical center axis (not shown) will extend through its center. In this embodiment, the umbilical center axis will extend through the intermediate friction control profile 15. Similarly, the respective power cables 7 have a (not shown) cable axis extending through their centers. Furthermore, in the embodiment shown in FIG. 1, a straight line (not shown) extending radially from the umbilical center axis and the cable center axis, will extend between two friction control profiles 13 that abuts the respective power cable 7. This differs from the embodiment shown in FIG. 4, wherein only one friction control profile 13 is associated with the respective power cables 7.

Figure 4:
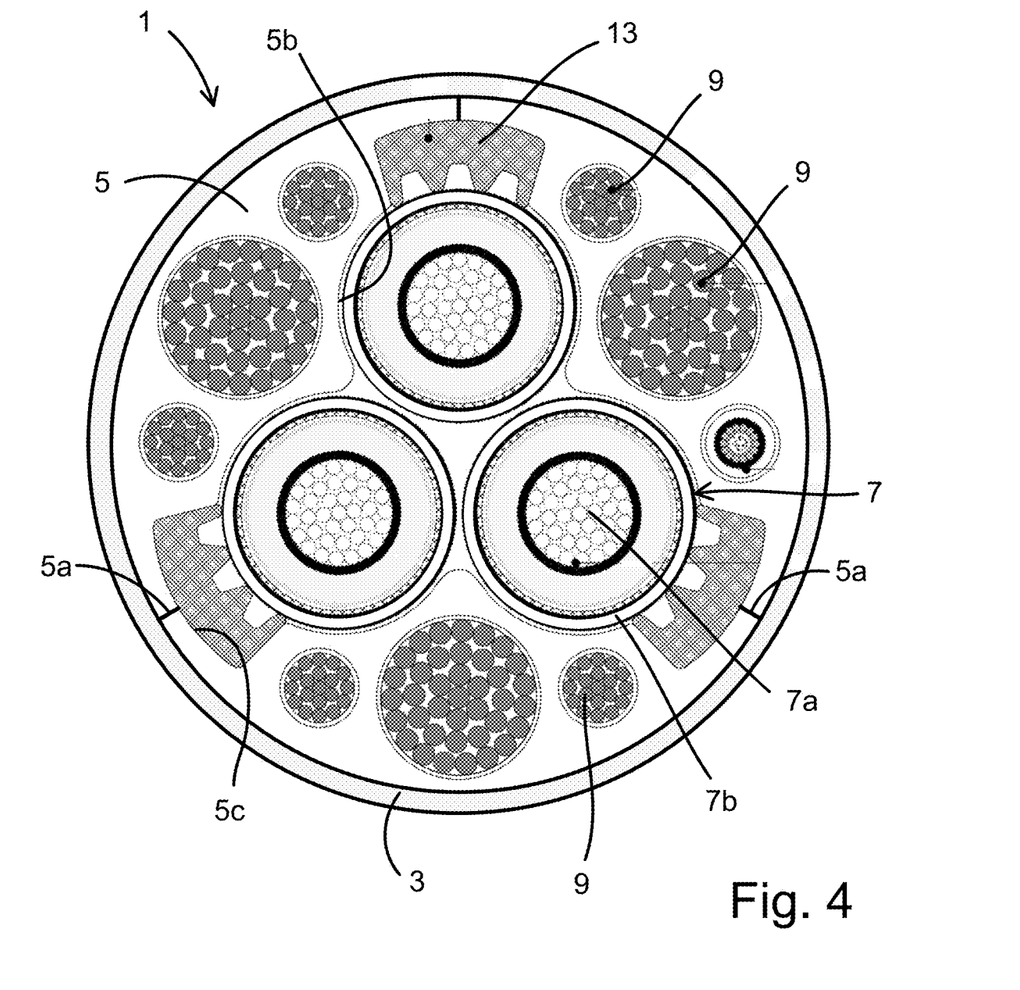
FIG. 4 illustrates an alternative embodiment of a power umbilical according to the invention.

Notably, with the embodiment shown in FIG. 4, one will need more radial distance between the outer jacket 3 and the power cable 7, than what is needed with the embodiment shown in FIG. 1.

The umbilical shown in FIG. 4 comprises three elongated filler elements 5, as does the embodiment shown in FIG. 1. Moreover, when the outer jacket 3 shrinks, it compresses the three elongated filler elements 5 into the complete circle, as the elongated filler elements 5 abut against each other at their abutment faces 5a.

Figure 5:
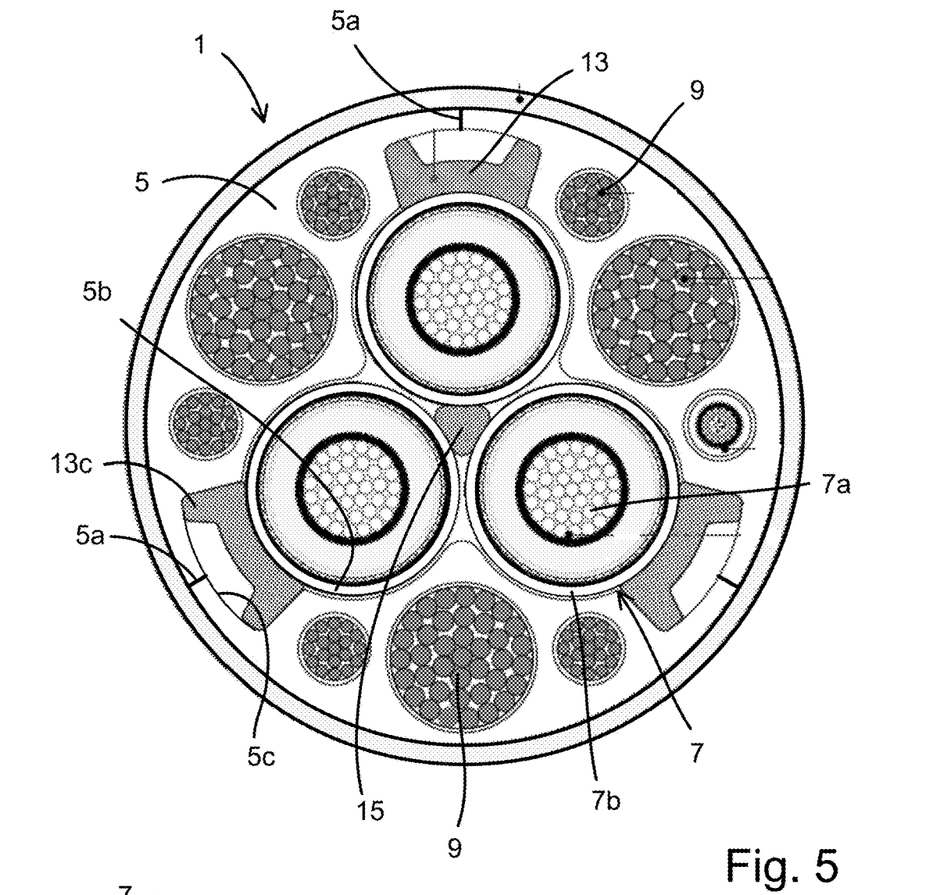
FIG. 5 depicts a cross section through another power umbilical according to the invention.

FIG. 5 depicts an embodiment of an umbilical 1 that in many respects corresponds to the embodiment shown in FIG. 4. However, in the embodiment of FIG. 5, the friction control profiles 13 comprise outward ridges 13c that extend radially outwards, towards the outer jacket 3 and away from the power cable 7.

Figure 5A:
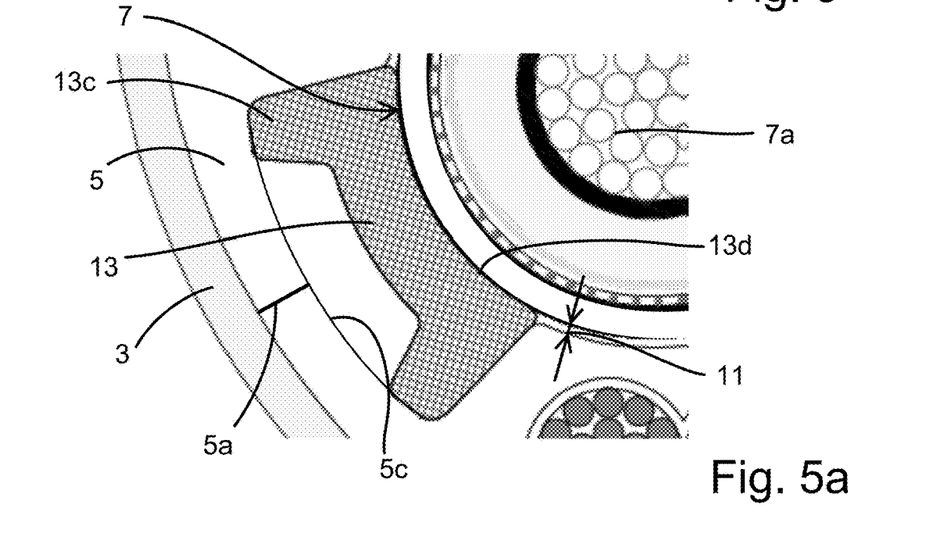
FIG. 5a is an enlarged portion of FIG. 5.

FIG. 5a depicts one of the friction control profiles 13 of the embodiment shown in FIG. 5 in better detail. The friction control profile 13 has two outward ridges 13c that abuts against the profile recess 5c of the elongated filler profile 5. In the shown embodiment, the abutment faces of two adjacent elongated filler elements 5 are located at the position of the profile recess 5c, such that the two abutting elongated filler elements 5 together form the profile recess 5c.

Furthermore, the friction control profiles 13 shown in FIG. 5 and FIG. 5a have a contact face which is a curved contact face 13d that abuts against the power cable 7. Hence, with such an embodiment, when the friction control profiles 13 are compressed, the part that is mostly compressed is the part abutting the elongated filler elements 5 and not the part that abuts against the power cable 7. Instead, the shape of the curved contact face 13d remains substantially unchanged during compression. Its curvature can advantageously be the same or similar to the outer curvature of the power cable 7.

Figure 6:
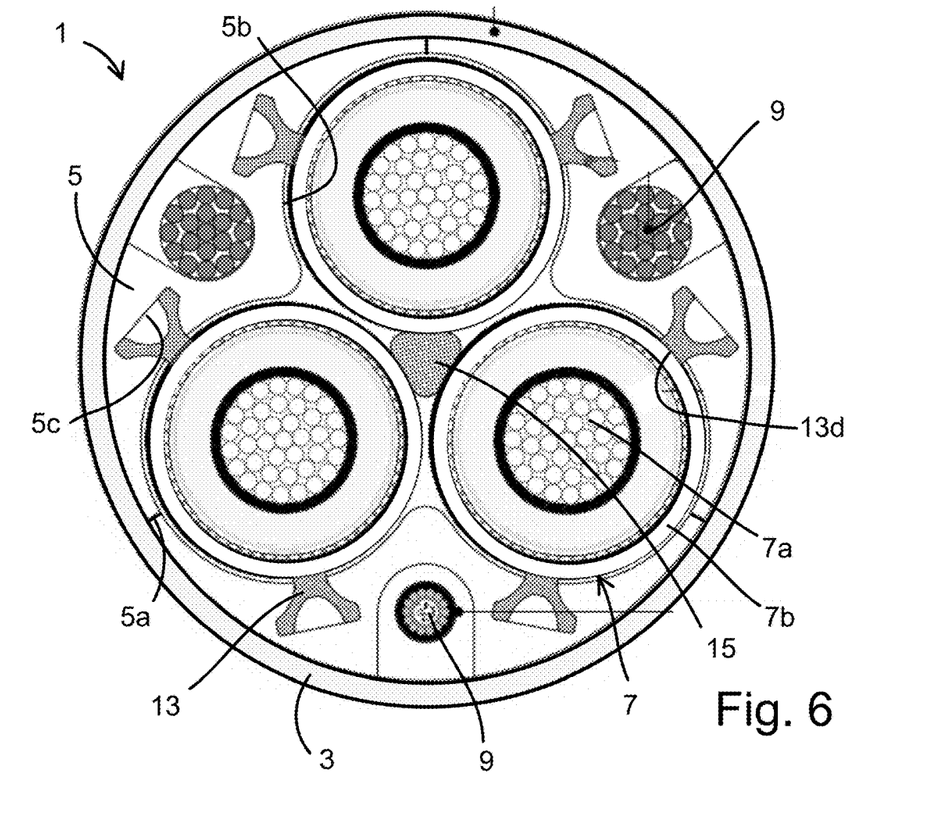
FIG. 6 depicts another embodiment of the power umbilical according to the invention.
Figure 6A:
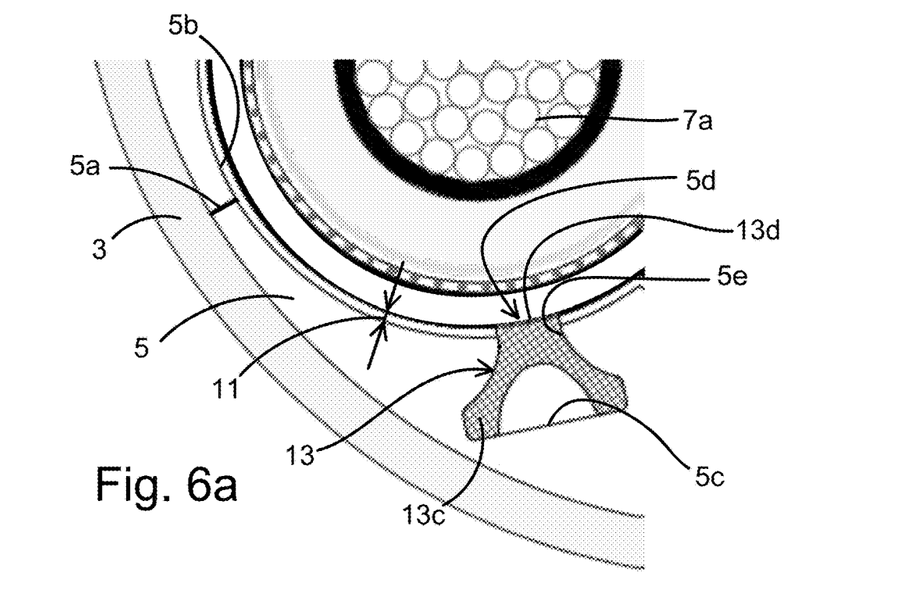
FIG. 6a is an enlarged portion of FIG. 6.

Reference is now made to FIG. 6 and FIG. 6a, which shows an enlarged portion of FIG. 6. As with the embodiment shown in FIG. 1, two friction control profiles 13 abut against each of the three power cables 7. In addition, an intermediate friction control profile 15 is arranged centrally in-between the three power cables 7.

As appears best from FIG. 6a, the profile recesses 5c comprise a recess aperture 5d which is narrower than what the profile recess 5c is inside the recess aperture 5d. The recess aperture 5d is shaped like slit that is defined by two opposite recess aperture edges 5e.

In the shown embodiment, the two outward ridges 13c of the friction control profile 13 occupy a space that is wider than the recess aperture 5d. Furthermore, as with the previous embodiments, the contact face 13d of the friction control profile 13 extends out beyond the recess aperture 5d and abuts the power cable 7, thus bridging the distance 11 between the outer face of the power cable 7 and the cable recess 5b of the elongated filler element 5.

Figure 7:
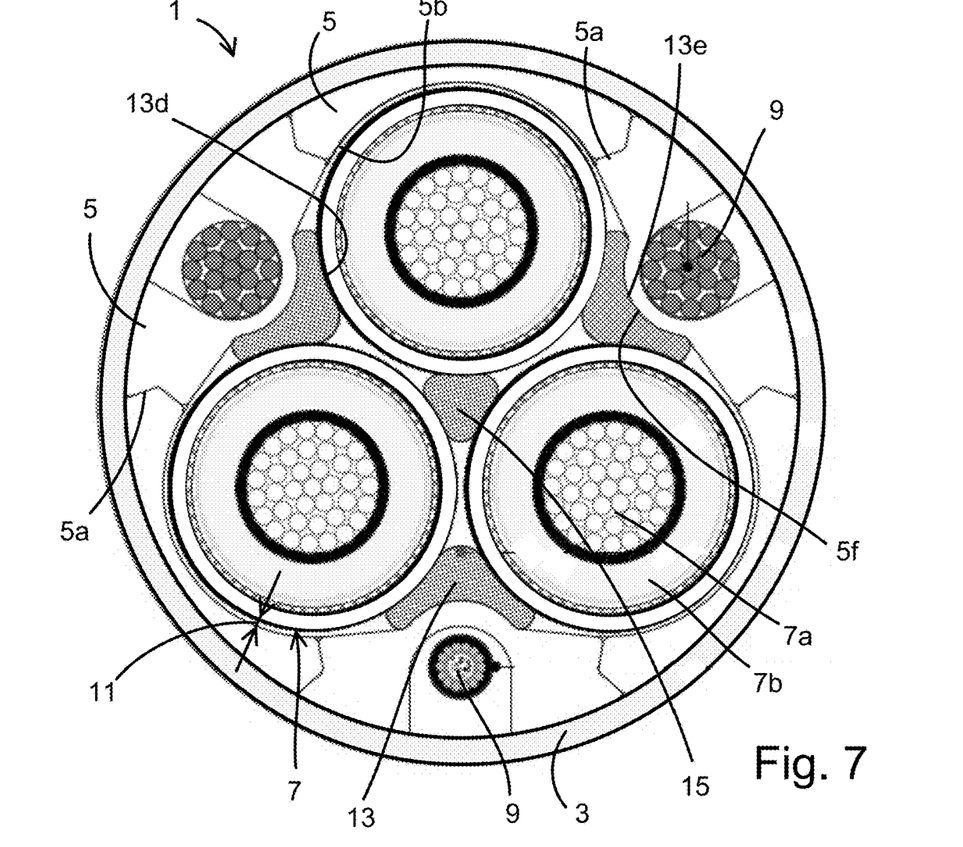
FIG. 7 depicts a cross section through a further embodiment of an umbilical according to the present invention.

FIG. 7 depicts a further embodiment of an umbilical 1 that comprises three power cables 7 and friction control profiles 13. In the previously discussed embodiments, the respective friction control profiles 13 abut only against one power cable 7, except for the intermediate friction control profile 15 arranged in-between the three power cables 7. In the embodiment shown in FIG. 7, however, the friction control profiles 13 abut against two power cables 7. In particular, the umbilical 1 shown in FIG. 7 comprises three power cables 7, three friction control profiles 13 and one intermediate friction control profile 15.

Still referring to FIG. 7. While in the previous embodiments the profile retainers are in form of profile recesses 5c, in the present embodiment the profile retainers are in form of profile protrusions 5f. The profile protrusions 5f protrude radially inwards at an angular position that is between two adjacent power cables 7. The profile protrusions 5f abuts a radially outwardly facing retainment face 13e of the friction control profiles 13. In this manner, the friction control profiles 13 are maintained in the correct position.

Thus, in this embodiment, imaginary lines that extend radially from the umbilical center axis and between the respective pairs of power cables 7, will extend through the friction control profiles 13.

Also differing from the previous embodiments is that there are more than three elongated filler elements 5. The umbilical 1 shown in FIG. 7 comprises six elongated filler elements 5 and consequently also six pairs of abutment faces 5a.

The abutment faces 5a in the embodiment shown in FIG. 7 are not coinciding with the imaginary lines extending from the umbilical center axis and through the respective center axes of the power cables. Instead, they are angularly displaced from these imaginary lines.

In some embodiments of the present invention, the friction control profiles 13 can be co-extruded with the elongated filler elements 5 during production of the latter. This is particularly relevant for embodiments where the friction control profiles 13 are embedded in profile recesses 5c of the elongated filler elements 5. Such embodiments are shown for instance in FIG. 1, FIG. 2 and in FIG. 6.

Figure 8:
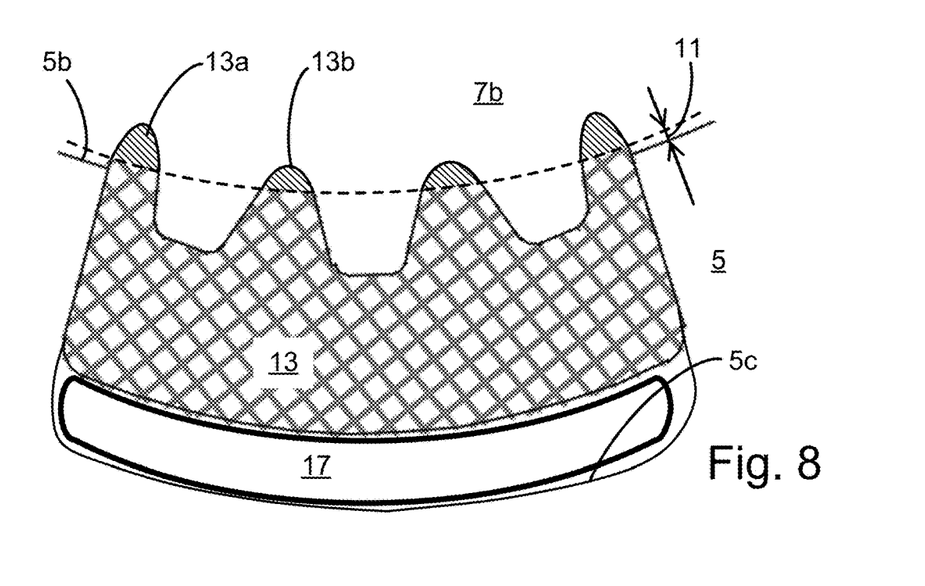
FIG. 8 is an enlarged portion of a friction control profile embedded in an profile recess, according to an embodiment of the invention.

FIG. 8 is an enlarged cross section view through one friction control profile 13, similar to the view shown in FIG. 3. In the embodiment shown in FIG. 8, however, there is arranged a shim 17 between the friction control profile 13 and the profile recess 5c of the filler element 5.

The shim 17 is shorter than the umbilical 1 itself and can have a length that for instance is less than 50 meters. The purpose of the shim 17 is to increase the friction against the power umbilicals 7. Due to the shims 17, there is less space available for the friction control profile 13. As a consequence, during production of the umbilical 1, at the axial location of the shim 17, the friction control profile 13 will become more compressed or deformed. The increased deformation results in increased friction between the power umbilicals 7 and the friction control profiles 13.

In some embodiments, several shims 17 may be provided in one single umbilical 1, at different axial positions along the extension of the umbilical 1.

Referring to the embodiment shown in FIG. 8, in addition to the deformable ridges 13a, the auxiliary ridges 13b are also compressed due to the additional compression brought about by the shim 17.

In the embodiment shown in FIG. 8, the shim 17 is interposed between the profile recess 5c and the friction control profile 13. In the embodiment shown in FIG. 7, the shim 17 could be interposed between the profile protrusion 5f and the friction control profile 13, such as between the profile protrusion 5f and the outwardly facing retainment face 13e.

Figure 9:
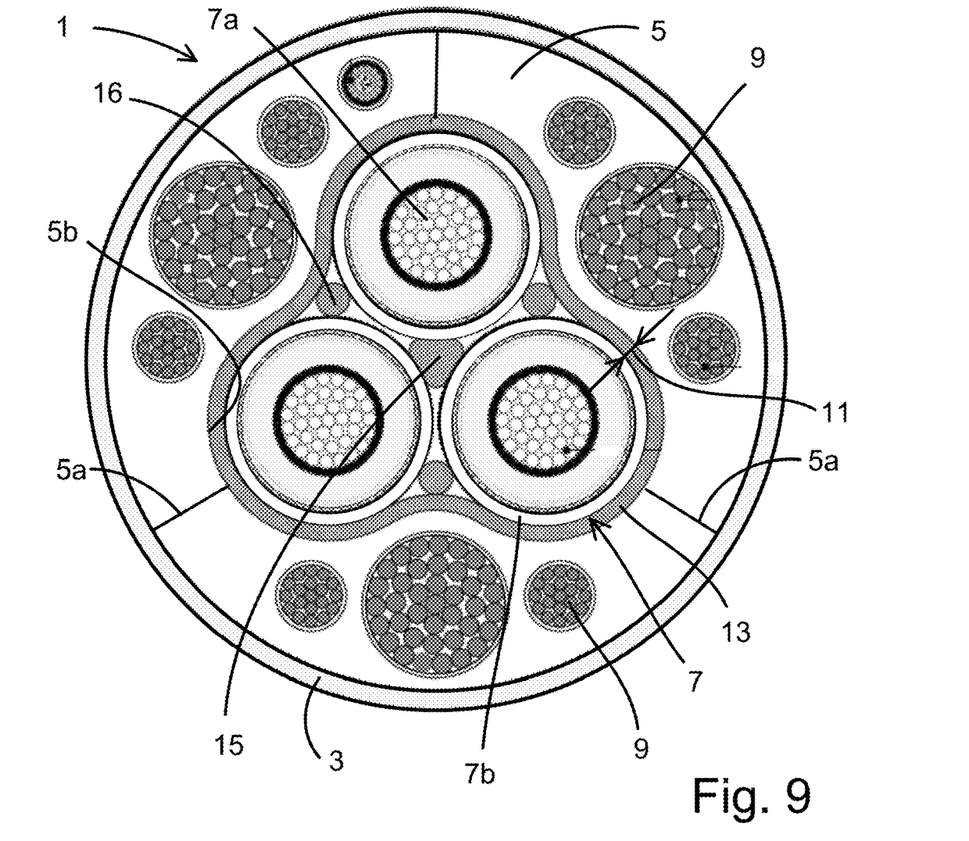
FIG. 9 depicts another embodiment of the umbilical according to the present invention.

Reference is now made to FIG. 9, which depicts a cross section view through another embodiment of a power umbilical 1. While the previous embodiments comprise three or six distinct friction control profiles 13, the umbilical 1 shown in FIG. 9 has one friction control umbilical 13 that encircles all three power cables 7. In this embodiment, there is also an intermediate friction control profile 15 interposed between the three power cables 7. Furthermore, there are also three auxiliary friction control profiles 16 arranged between the friction control profile 13 and two power cables 7.

When the outer jacket 3 shrinks, during production of the power umbilical 1, the elongated filler elements 5 will be compressed into a continuous ring, as discussed above, as the respective elongated filler elements 5 abut each other at their abutment faces 5a. While the friction control profile 13, which fully encircles the three power cables 7, will be somewhat compressed, it will not be as compressed as the friction control profiles 13 shown in the previous embodiments. This is because the distance 11, or the space between the cable recesses 5b and the power cables 7 are filled to a larger degree in the embodiment shown in FIG. 9. However, the intermediate friction control profile 15 and the auxiliary friction control profiles 16 may be compressed to a greater extent. As will be understood, the degree of compression will depend on the particular design and dimensioning. The skilled person may adapt the dimensions of the elongated filler elements 5, the friction control profile 13, the intermediate friction control profile 15 and the auxiliary friction control profiles 16 according to the desired friction.

With the embodiment shown in FIG. 9, it is also possible to insert a shim 17 (not shown) between the elongated filler element 5 and the friction control profile 13.

Figure 10:
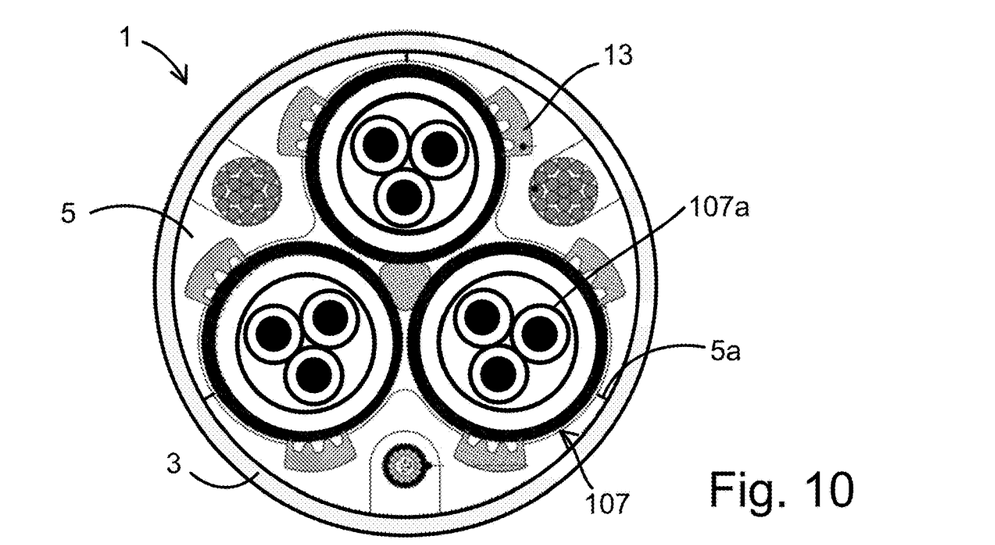
FIG. 10 depicts an umbilical according to the invention, comprising three sets of multicore power cables.

FIG. 10 illustrates an embodiment of the present invention wherein instead of having three power cables 7, such as in the embodiment shown in FIG. 1, the umbilical 1 comprises three power cable sets 107 that each comprises three power cables 107a. As shown in FIG. 10, the power cable set 107 is configured as one single cable comprising three conductors, i.e. the three power cables 107a.

Figures 11, 12, 13, 14:
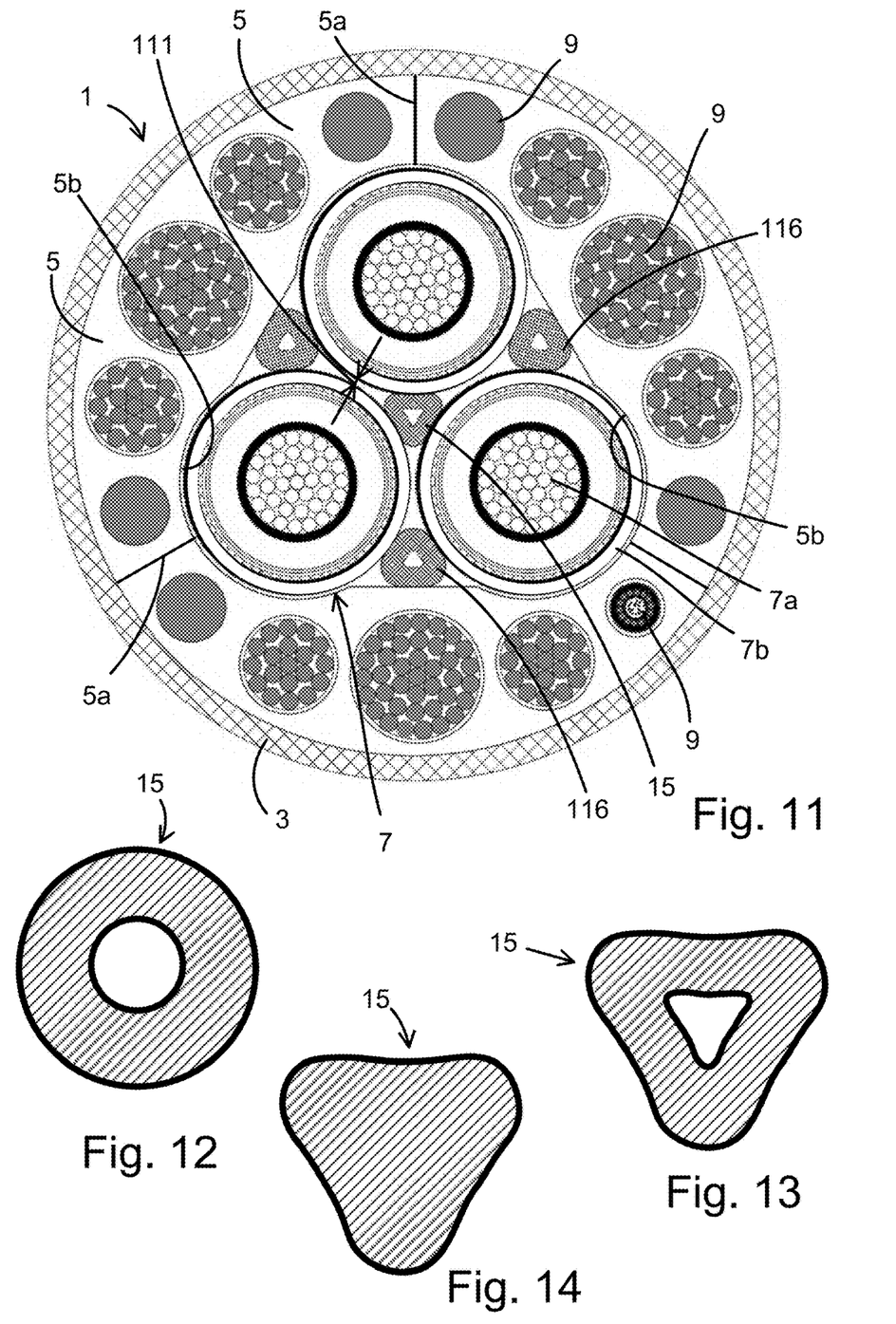
FIG. 11 shows the cross section through another embodiment of an umbilical according to the invention.
FIG. 12 depicts a cross-section through an intermediate friction control profile or an auxiliary friction control profile formed as a hollow tube, in a non-compressed state.
FIG. 13 shows the intermediate friction control profile or the auxiliary friction control profiled of FIG. 12 in a compressed/deformed state.
FIG. 14 shows an intermediate friction control profile or an auxiliary friction control profile corresponding to FIG. 13, however wherein it is shaped as a solid (i.e. non-hollow) rod.

Reference is now made to FIG. 11, which shows an alternative embodiment a power umbilical 1. The power umbilical 1 according to this embodiment resembles somewhat the embodiments shown in FIG. 7 and in FIG. 9. The power umbilical 1 comprises three power cables 7 that are arranged in a triangular fashion. Interposed between and abutting against the three power cables 7 is an intermediate friction control profile 15. The intermediate friction control profile 15 is in the form of a compressed, hollow tube. The hollow tube is shown in an original, non-compressed state in FIG. 12, and in a compressed state (as in FIG. 11) in FIG. 13. Designing the intermediate friction control profile 15 as a hollow tube increases its deformability when being compressed between the three power cables 7.

Also shown in FIG. 11 are three auxiliary friction control profiles 116. The auxiliary friction control profiles 116 each abut against two power cables 7 and a radially outer element, which in the shown embodiment is an elongated filler element 5.

While FIG. 12 and FIG. 13 depict an intermediate friction control profile 15 in an original and in a compressed state, respectively, these figures could also correspond to an original state and a compressed state of the auxiliary friction control profile 116.

Moreover, while FIG. 12 and FIG. 13 depict an embodiment where the intermediate friction control profile 15 (or an auxiliary friction control profile 116) is in the form of a hollow tube, FIG. 14 depicts an intermediate friction control profile 15 in the form of a solid rod. Again, FIG. 14 could also correspond to an auxiliary friction control profile 116.

Referring again to FIG. 11, a mutual power cable distance 111 is indicated between adjacent power cables 7. The mutual power cable distance 111 is provided by the intermediate friction control profile 15 and by the auxiliary friction control profiles 116. As the skilled person will appreciate, the mutual power cable distance 111 can be provided also without the auxiliary friction control profiles 116.

The intermediate friction control profile 15 and/or the auxiliary friction control profiles 116 can advantageously be core-less. I.e., they can be without any additional elongated element at their center. This contrasts for instance from an electrical wire or an optical wire, which has a core of an electrically conductive or optically conductive material.

It shall be appreciated that although most of the power umbilicals 1 discussed above all comprise three power cables 7, other embodiments may comprise more than three power cables 7. For instance, some umbilicals according to the invention may comprise two sets of three power cables. Such umbilicals may be suited to convey two three-phase power transmissions.

A possible application of an umbilical 1 according to the present invention is in association with an offshore, floating power plant. For instance, the umbilical 1 can connect to a floating wind turbine assembly (not shown) or to a floating photovoltaic (solar) power plant. From the power plant, the umbilical could typically extend down to the seabed and further towards the shore or an offshore power hub. The umbilical 1 would then be exposed to movements, such as due to sea currents and waves.

The invention claimed is:

1. A power umbilical comprising:
    a plurality of power cables for electric power transmission;
    a plurality of elongated filler elements; and
    an outer sheath surrounding the plurality of power cables and the plurality of elongated filler elements;
    wherein the plurality of elongated filler elements abut against each other at abutment faces, thereby forming a complete ring enclosing the plurality of power cables;
    wherein the plurality of elongated filler elements comprise cable recesses within which the plurality of power cables are embedded;
    one or more friction control profiles;
    wherein the material of the one or more friction control profiles is softer than the material of the plurality of elongated filler elements;
    wherein the one or more friction control profiles are arranged in a compressed deformed state; and
    wherein the plurality of power cables are embedded within the cable recesses with a distance from the cable recesses, wherein the one or more friction control profiles extend along the elongated filler elements, and wherein the one or more friction control profiles arranged in the compressed deformed state are between the elongated filler elements and the plurality of power cables.

2. The power umbilical according to claim 1, wherein a mutual power cable distance is present between the plurality of power cables.

3. The power umbilical according to claim 1, wherein the elongated filler elements comprise profile retainers.

4. The power umbilical according to claim 3, wherein the profile retainers are in the form of element protrusions protruding into retainment faces of the one or more friction control profiles.

5. The power umbilical according to claim 1, wherein the plurality of power cables, when the power umbilical is in a non-bent and straight state, only abut against one or more of the one or more friction control profiles or only abut against one or more of the one or more friction control profiles and adjacent power cables of the plurality of power cables.

6. The power umbilical according to claim 1, wherein:
    respective power cables of the plurality of power cables abut against two friction control profiles of the one or more friction control profiles, or respective power cables of the plurality of power cables abut against two friction control profiles of the one or more friction control profiles and an intermediate friction control profile of the one or more friction control profiles; and the two friction control profiles are angularly displaced away from a radially extending line extending from a power-umbilical center axis and through a center axis of a respective power cable of the plurality of power cables.

7. The power umbilical according to claim 1, wherein the one or more friction control profiles comprise one, two or more deformable ridges.

8. The power umbilical according to claim 1, comprising a shim between a profile retainer and a friction control profile of the one or more friction control profiles, and wherein the shim has a smaller axial extension than the power umbilical.

9. The power umbilical according to claim 1, wherein the one or more friction control profiles comprise one or more of:
rubber;
an elastomer; and
a semiconductive material.

10. The power umbilical according to claim 1, comprising:
power cable sets;
wherein each power cable set comprises a plurality of the plurality of power cables; and
wherein each power cable set is configured as one separate cable.

11. The power umbilical according to claim 1, wherein the one or more friction control profiles are arranged in the compressed deformed state between three or more of the plurality of power cables.

12. The power umbilical according to claim 11, wherein the one or more friction control profiles is a compressed, hollow tube.

13. The power umbilical according to claim 12, wherein a wall thickness of the hollow tube is at least 50% of an inner diameter of the hollow tube.

14. The power umbilical according to claim 1, wherein a mutual power cable distance is present between the plurality of power cables.

15. The power umbilical according to claim 1, wherein the elongated filler elements comprise profile retainers.

16. A power umbilical comprising: a plurality of power cables for electric power transmission; a plurality of elongated filler elements; and an outer sheath surrounding the plurality of power cables and the plurality of elongated filler elements; wherein the plurality of elongated filler elements abut against each other at abutment faces, thereby forming a complete ring enclosing the plurality of power cables; wherein the plurality of elongated filler elements comprise cable recesses within which the plurality of power cables are embedded; one or more friction control profiles; wherein the material of the one or more friction control profiles is softer than the material of the plurality of elongated filler elements; wherein the one or more friction control profiles are arranged in a compressed deformed state; wherein the one or more friction control profiles are arranged in the compressed deformed state between three or more of the plurality of power cables; and wherein the one or more friction control profiles is a compressed, hollow tube.

17. The power umbilical according to claim 16, wherein a wall thickness of the hollow tube is at least 50% of an inner diameter of the hollow tube.

18. The power umbilical according to claim 16, wherein the profile retainers are in the form of element protrusions protruding into retainment faces of the one or more friction control profiles.

19. A power umbilical comprising:
a plurality of power cables for electric power transmission;
a plurality of elongated filler elements; and
an outer sheath surrounding the plurality of power cables and the plurality of elongated filler elements;
wherein the plurality of elongated filler elements abut against each other at abutment faces, thereby forming a complete ring enclosing the plurality of power cables;
wherein the plurality of elongated filler elements comprise cable recesses within which the plurality of power cables are embedded;
one or more friction control profiles;
wherein the material of the one or more friction control profiles is softer than the material of the plurality of elongated filler elements;
wherein the one or more friction control profiles are arranged in a compressed deformed state;
wherein the elongated filler elements comprise profile retainers; and
wherein the profile retainers are in the form of profile recesses, recessed in the cable recesses.

* * * * *